(No Model.) 2 Sheets—Sheet 1.

I. W. GREGG.
COMBINED COTTON CHOPPER AND CULTIVATOR.

No. 452,183. Patented May 12, 1891.

Witnesses,
J. C. Doan
Amos K. Shute

Inventor,
Israel W. Gregg
by W. J. Dennis
Attorney (No Model.) 2 Sheets—Sheet 2.

I. W. GREGG.
COMBINED COTTON CHOPPER AND CULTIVATOR.

No. 452,183. Patented May 12, 1891.

Witnesses,

Inventor,

UNITED STATES PATENT OFFICE.

ISRAEL W. GREGG, OF CHESTER, INDIANA.

COMBINED COTTON CHOPPER AND CULTIVATOR.

SPECIFICATION forming part of Letters Patent No. 452,183, dated May 12, 1891.

Application filed November 20, 1890. Serial No. 372,116. (No model.)

*To all whom it may concern:*

Be it known that I, ISRAEL W. GREGG, a citizen of the United States, residing at Chester, in the county of Wayne and State of Indiana, have invented certain new and useful Improvements in Combined Cotton Choppers and Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of farm implements used for cultivating and regulating the growth of cotton and other crops.

My invention consists in the use of one or more plows attached to a two-wheeled vehicle for the cultivation of the plants, and combined therewith an automatic chopper or cutting-arm which is actuated by lugs on the wheel at such intervals as may be desired.

Figure 1:
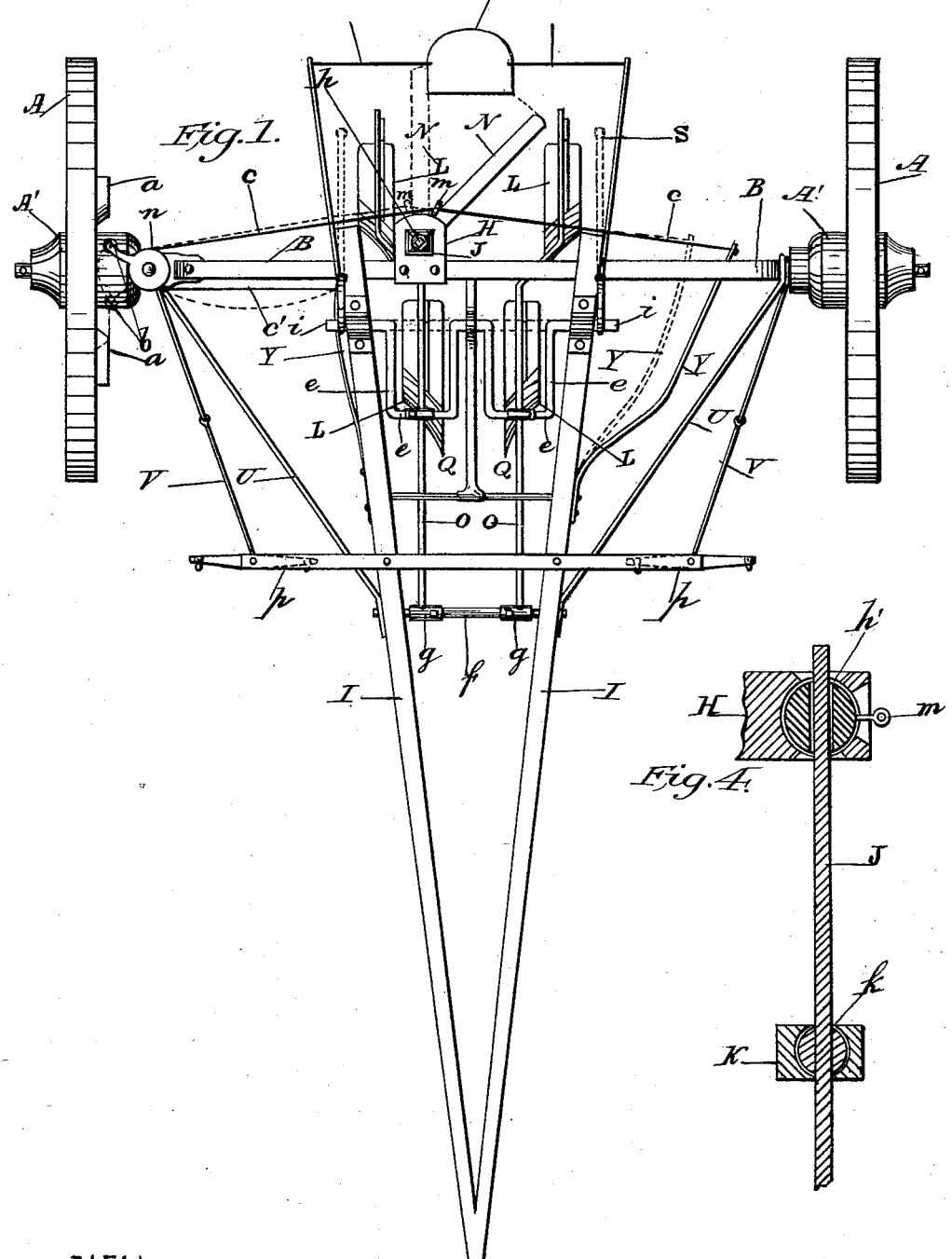
Figure 2:
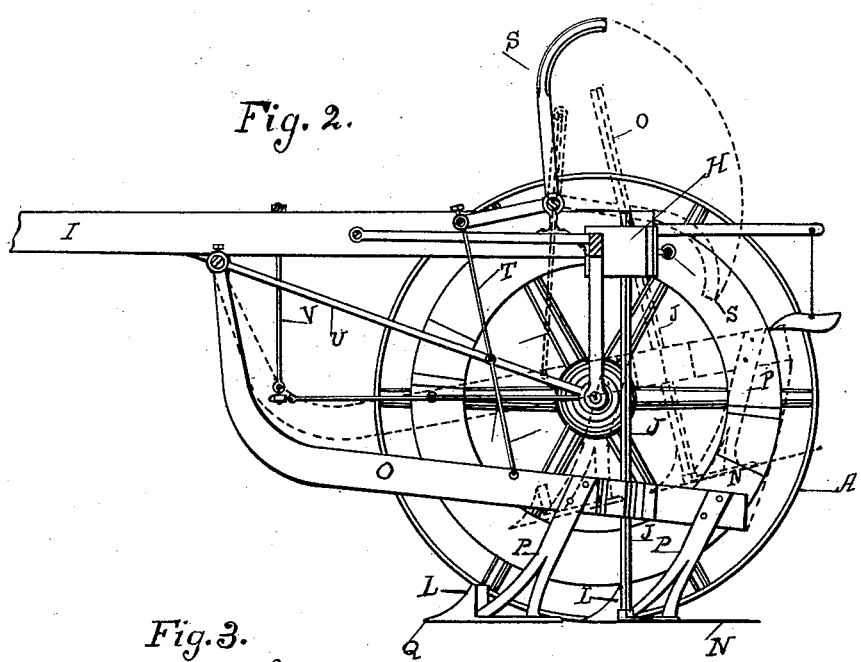
Figure 3:
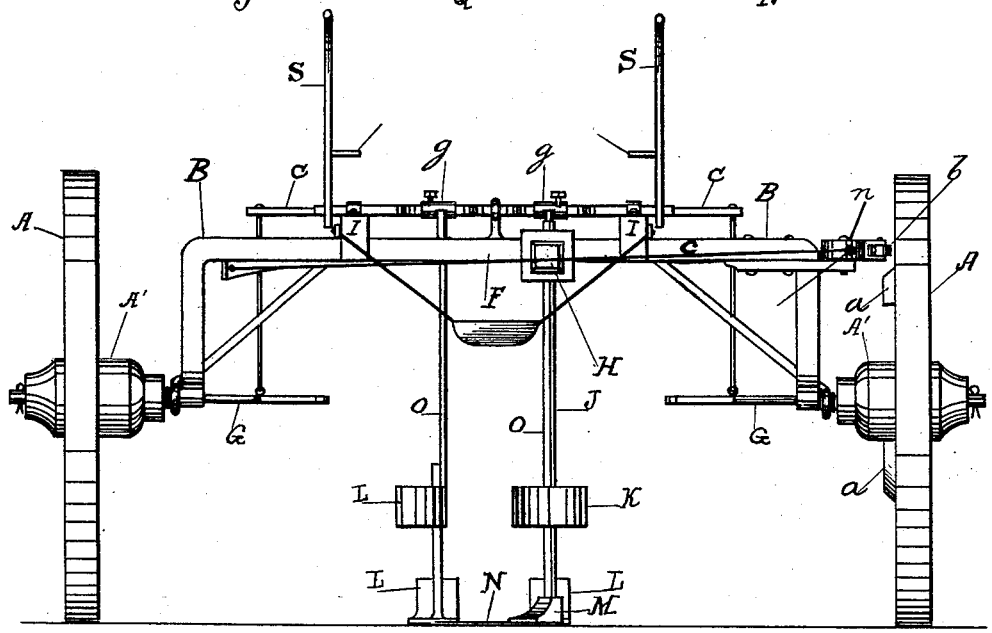

In the drawings, Figure 1, Sheet 1, is a top plan view of my improvement. Fig. 2, Sheet 2, is a side elevation of one portion of the implement divided vertically in the center longitudinally. Fig. 3, Sheet 2, is a rear elevation of my improved implement. Fig. 4, Sheet 1, is a vertical section of the shaft operating the knife or cutting-arm, showing its attachments.

In Fig. 1, Sheet 1, A A represent the wheels; B, the axle, and I I the bifurcated tongue or pole.

H is a box which incloses a ball-and-socket joint.

J is a vertical shaft which passes through the sphere of the ball-and-socket joint and is allowed to move up and down through an opening in the ball of said joint.

O O are curved beams to which the plows for cultivating are attached, and marked L L L L, each beam carrying two plows, one in front and one behind the axle B. The beams O O are secured at their front ends to a cross-rod $f$ by means of collars $g$, which are arranged to be adjustable laterally on said rod $f$ and secured at any required point by set-screws. The rod $f$ is secured to the side pieces of the tongue I nearly at right angles. The beams O O are adapted to be raised or depressed by arms attached to a stirrup-frame $e\ e\ e\ e$, which has its bearings on the side pieces of the tongue, as shown at $i\ i$, and is operated by the hand-lever S. The vertical shaft J is formed square, and near its lower end is rigidly attached to a ball or sphere $k$, which occupies a corresponding hollow space in a block K, and a partial motion is allowed by the movement of the ball within said space. To the lower end of the shaft J in Fig. 2, Sheet 2, is attached a horizontal blade N, having a sharp edge, the blade being secured in a suitable manner to a block M, rigidly attached to bottom part of the shaft J, Fig. 3, Sheet 2. By its connections with balls $k$ and $h'$ it is permitted a rotating motion in a horizontal plane, and thus imparts a cutting motion to the blade N in the arc of a circle in vertical plane.

One of the wheels A is provided with lugs $a\ a$ on the inner surface of the fellies, which as the wheel revolves are brought in contact with a projecting arm $b$, extending out from the circumference of a cylinder $n$, by which said cylinder is revolved partially. One end of a wire cord $c$ is attached to the outer surface of the cylinder $n$, which extends to an arm $m$ on the ball $h'$, Fig. 4, to which it is secured, and then passing parallel with the axle B is connected to a lever-spring Y, which serves to restore the cylinder $n$ to its place after having been turned by the lug $a$. The ball $h'$ is provided with a square opening through its diameter vertically, which receives the shaft J and gives a partial revolution to it as it is revolved by the action of the cylinder $n$ and lugs $a\ a$. The block H is made adjustable laterally on the axle B, to which it is properly secured. The ball-and-socket joint permits a universality of motion to the shaft J, by which it is readily adapted to uneven surfaces.

In Fig. 2, Sheet 2, P P are the standards of the plows L L L L, which are secured to the beams O O.

Q, Fig. 2, is a shoe or float which sustains the weight of the plow and forms the sole thereof and serves to regulate the height of plane in which the cutting-blade N moves by means of the standard P and beam O, which are secured to the block K, which controls the vertical movement of the shaft J.

It will be seen that as the shaft J and the cutting-bar N are operated primarily by lugs $a\ a$ on the wheel A the space between the cuts depends upon the distance between the lugs $a\ a$, and the number of cuts to each revolution is regulated in the same manner, while the area of the single cut is governed by the length of the cutting-blade.

By means of the hand-lever S, operating the stirrup-frame $e\ e\ e$ and its connections, the beams and plows are elevated at pleasure.

A cross-bar $p\ p$ is attached to the side pieces of the tongue at right angles, to the ends of which the singletrees may be attached, and braces V V extend from each end of the same to the axle B, near the hub A'.

When arranged for operation, the shaft J is placed in such position as to place the cutting-blade N diagonally across the row or line of plants, so that it has a continuous cut, except when thrown back, in line of motion of the implement by the action of the lugs $a\ a$.

The block M, to which the cutting-blade is attached, is arranged to be moved up and down on the shaft J, so that the cut of the knife is regulated in its height.

The spring Y and cable $c'$ serve to return the cylinder $n$ to its position to enable the lug $a$ to engage the arm $b$ at each operation.

Having thus fully described my said invention, what I claim as new, and desire to secure by Letters Patent, is—

Combined with a two-wheel or other vehicle, the lugs $a\ a$, cylinder $n$, provided with an arm $b$, cable $c$, ball and socket $h'$, the ball provided with an arm $m$, and the shaft J, having a cutting-arm at its lower end, all constructed and operating substantially in the manner and for the purpose as set forth and described.

In testimony whereof I affix my signature in presence of two witnesses.

ISRAEL W. GREGG.

Witnesses:
ALMERON T. CHAPIN,
W. T. DENNIS.